US007949999B1

(12) United States Patent  
Willeford

(10) Patent No.: US 7,949,999 B1  
(45) Date of Patent: May 24, 2011

(54) PROVIDING SUPPORT FOR MULTIPLE INTERFACE ACCESS TO SOFTWARE SERVICES

(75) Inventor: James C. Willeford, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 959 days.

(21) Appl. No.: 11/835,315

(22) Filed: Aug. 7, 2007

(51) Int. Cl.
*G06F 9/45* (2006.01)
*G06F 9/445* (2006.01)

(52) U.S. Cl. .................. 717/120; 717/101; 717/121

(58) Field of Classification Search .......... 717/101–102, 717/120–122
See application file for complete search history.

(56) References Cited

U.S. PATENT DOCUMENTS

| | | | | |
|---|---|---|---|---|
| 5,710,925 | A | 1/1998 | Leach et al. | 395/683 |
| 6,526,566 | B1 * | 2/2003 | Austin | 717/109 |
| 6,947,943 | B2 * | 9/2005 | DeAnna et al. | 717/120 |
| 6,990,636 | B2 * | 1/2006 | Beauchamp et al. | 715/764 |
| 7,051,071 | B2 * | 5/2006 | Stewart et al. | 709/204 |
| 7,076,784 | B1 * | 7/2006 | Russell et al. | 719/315 |
| 7,127,700 | B2 | 10/2006 | Large | 717/100 |
| 7,251,693 | B2 * | 7/2007 | Stull et al. | 709/225 |
| 7,302,585 | B1 * | 11/2007 | Proudler et al. | 713/189 |
| 7,340,714 | B2 * | 3/2008 | Upton | 717/102 |
| 7,444,349 | B1 * | 10/2008 | Ochotta | 1/1 |
| 7,467,371 | B1 * | 12/2008 | Meredith et al. | 717/104 |
| 7,483,966 | B2 * | 1/2009 | Cromer et al. | 709/223 |
| 7,503,033 | B2 * | 3/2009 | Meredith et al. | 717/104 |

OTHER PUBLICATIONS

Jacobsen et al, "A design pattern based approach to generating synchronization adaptors from annotated IDL", IEEE, pp. 63-72, 1998.*
Bramley et al, "A component based services architecture for building distributed applications", IEEE, pp. 51-59, 2000.*
Merzky et al, "Application level interoperability between clouds and grids", IEEE, pp. 143-150, 2009.*
Sun et al, "Transparent adaption of signle user applications for multi user real time collaboration", ACM Trans. on Computer Human Interaction, vol. 13, No. 4, pp. 531-582, 2006.*
Colazzo et al, "Detection of corrupted schema mapping in XML data integartion systems", ACM Trans. on Internet Tech. vol. 9, No. 9, pp. 1-53, 2009.*
Papazoglou et al, "Service oriented architectures: approaches, technologies and research issues", The VLDB Journal, 16: 389-415, 2007.*
"The Chord/DHash Project—Chord FAQ" retrieved Jul. 17, 2007, from http://pdos.csail.mit.edu/chord/faq.html, 4 pages.

(Continued)

*Primary Examiner* — Anil Khatri
(74) *Attorney, Agent, or Firm* — Seed IP Law Group PLLC

(57) ABSTRACT

Techniques are described for providing enhanced access to software services or other software programs that provide interfaces for use by clients. The enhanced access may, for example, be provided for a software service having multiple distinct versions with distinct corresponding interfaces, such as if some clients continue to initiate access to older versions of the software service using corresponding older interfaces, while other clients initiate access to a current software service version using a corresponding current interface version. The enhanced access techniques may further include automatically adapting requests that correspond to older interface versions of a software service so that the adapted requests correspond to the current interface version for the software service, and responses may similarly be adapted from a format for a current version of a software service to a format for a prior interface version used by the request that resulted in the response.

36 Claims, 7 Drawing Sheets

OTHER PUBLICATIONS

"The Chord/DHash Project—Overview" retrieved Jul. 17, 2007, from http://pdos.csail.mit.edu/chord/, 1 page.

"What is an Entity Bean?" The J2EE™ Tutorial, retrieved Jul. 17, 2007, from http://java.sun.com/j2ee/tutorial/1_3-fcs/doc/EJBConcepts4.html, 4 pages.

Carbonado, homepage, retrieved Jul. 17, 2007, from http://carbonado.sourceforge.net, 3 pages.

Cecchet, E., et al., "C-JDBC: Flexible Database Clustering Middleware," Mar. 2005, ObjectWeb, retrieved Jul. 17, 2007, from http://c-jdbc.objectweb.org/current/doc/C-JDBC_Flexible_Database_Clustering_Middleware,.pdf, 10 pages.

Chen, P., "The Entity-Relationship Model—Toward a Unified View of Data," Mar. 1976, *ACM Transactions on Database Systems* 1(1):9-36, retrieved Jul. 17, 2007, from http://bit.csc.lsu.edu/~chen/pdf/erd.pdf, 28 pages.

Gamma, E., et al. *Design Patterns: Elements of Reusable Object-Oriented Software*. Addison-Wesley, Boston, 1995.

Hibernate.org, Relational Persistence for Java and .NET, retrieved Jul. 17, 2007, from http://www.hibernate.org/, 3 pages.

Hibernate.org, Product Evaluation FAQ, retrieved Jul. 17, 2007, from http://www.hibernate.org/263.html, 4 pages.

JBoss.com, "Object and Relational Mapping (ORM) with Hibernate," retrieved Jul. 17, 2007, from http://www.jboss.com/pdf/HibernateBrochure-Jun2005.pdf, 4 pages.

Karger, D., et al., "Consistent Hashing and Random Trees: Distributed Caching Protocols for Relieving Hot Spots on the World Wide Web," May 1997, (ACM) Symposium on Theory of Computing, retrieved Jun. 19, 2007, from http://citeseer.ist.psu.edu/cache/papers/cs/2895/http:zSzzSztheory.lcs.mit.eduzSz~kargerzSzPaperszSzweb.pdf/karger97consistent.pdf, 10 pages.

ObjectWeb.org, Homepage, retrieved Jul. 17, 2007, from http://c-jdbc.objectweb.org/, 2 pages.

ObjectWeb.org, "C-JDBC: Scalability and High Availability for your Database," Jan. 2006, retrieved Jul. 17, 2007, from http://c-jdbc.objectweb.org/current/doc/C-JDBC-Brochure-EN.pdf, 2 pages.

ObjectWeb.org, How does it work?, , retrieved Jul. 17, 2007, from http://c-jdbc.objectweb.org/howdoesitwork.html, 1 page.

Wikipedia, "Object-relational Mapping," retrieved Jul. 17, 2007, from http://en.wikipedia.org/wiki/Object-relational_mapping, 4 pages.

\* cited by examiner

PROVIDING SUPPORT FOR MULTIPLE INTERFACE ACCESS TO SOFTWARE SERVICES

TECHNICAL FIELD

The following disclosure relates generally to providing support for clients to use multiple interfaces when accessing software services, including support for multiple versions of a particular interface.

BACKGROUND

As the use of the Internet and the World Wide Web ("Web") has become widespread, it is increasingly common for users to access and use various types of capabilities provided by remote computing systems over the Web, including to search for, shop for and order items (such as products, services and/or information) that are for purchase, rent, lease, license, trade, evaluation, sampling, subscription to, etc. In addition to such user-initiated interactions, software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services. The use of Web services to enable software programs to interact is in some situations referred to as one example of a service-oriented architecture.

While the use of remote software services by software programs provides various benefits, various problems also exist. For example, each software service will typically provide a distinct interface for others to use when accessing the service, such that a software program using multiple remote services may need to manage and support various different interfaces for those multiple services. In addition, as a service evolves or otherwise changes, multiple versions of the service may be created, with the interface to the service similarly changing for some or all of the service versions so as to create multiple distinct versions of the interface. If a provider of such a changing service does not continue to support previous versions of the service, a client software program that uses the service may further need to be modified to adapt to the newest version of the service, such as to use the newest service interface, thus creating further difficulties for the client software program's creator and users. Alternatively, the provider of the changing service may minimize that problem by continuing to provide and support some or all of the previous versions of the service, but such continued support is difficult and expensive for the service provider. For example, the service provider may need to maintain separate software code for each such supported version of the service, which increases the storage needs, maintenance costs, and testing requirements for the service provider. Furthermore, in such situations, the service provider may need to create and maintain a separate front-end handler that receives each client request and directs the request to the appropriate separate software code for the service version for that request, which increases the computing nodes and development costs for the service provider.

DETAILED DESCRIPTION

Figure 1:
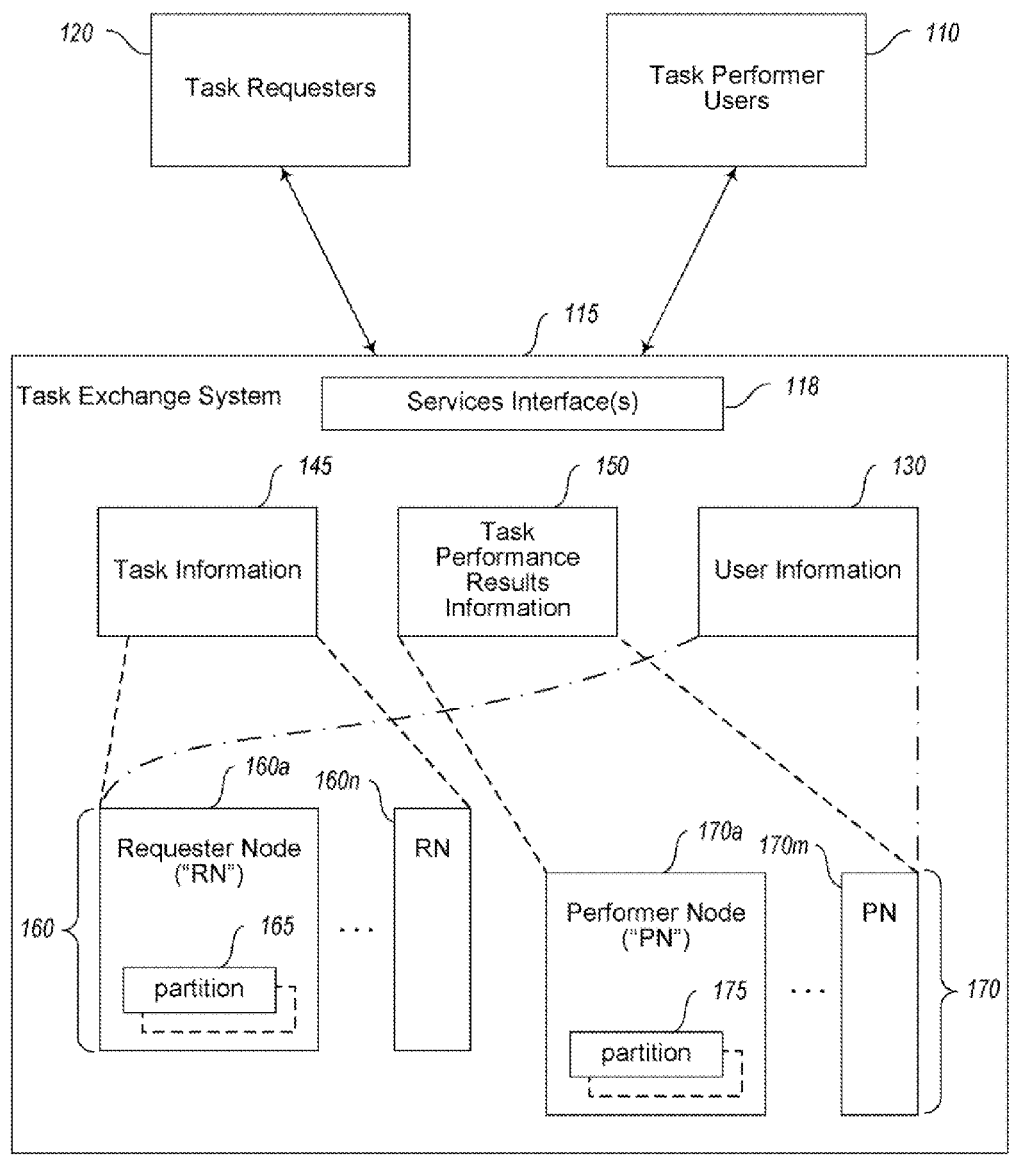
FIG. 1 is a network diagram illustrating an example of users interacting with a remote system that stores various data and provides various types of functionality.

Techniques are described for, among other things, providing enhanced access to software services via interfaces provided for clients to use in obtaining functionality. The service interfaces may, for example, be defined APIs that are specified in various forms, such as using WSDL-based interfaces for Web services. In at least some embodiments, the enhanced access is provided for one or more software services (or other software programs) that each has multiple distinct versions with distinct corresponding interfaces, such as in situations in which some clients may continue to initiate access to older versions of the software service using the corresponding older interfaces for those versions, while other clients initiate access to a current version of the software service using a corresponding current version of the interface. In such embodiments, the enhanced access techniques may include automatically adapting requests that are specified using older interface versions of a software service so that the adapted requests reflect the current interface version for the software service, such as to allow the current version of the software service to handle some or all such requests. Furthermore, in at least some such embodiments, when a response to a request is obtained from a current version of a software service in a format corresponding to the current interface version for the software service, but the initial received request was specified using a prior interface version corresponding to a prior version of the software service and was adapted to the current interface version, the enhanced access techniques may further include automatically adapting that obtained response to reflect a format for the prior interface version used by the request. Additional details related to the described techniques for providing enhanced access to software services are included below. In addition, in at least some embodiments, at least some of the described techniques are automatically performed by an embodiment of one or more Interface Adaptation Manager systems, as described in greater detail below.

In at least some embodiments, the enhanced access to software services includes, for each of one or more software services provided by a software program or system, providing access to multiple versions of one or more interfaces to the software service. For example, when a software program is executing on a first computing system and uses a remote service provided by a distinct second computing system over one or more networks, the enhanced access may include the second computing system transparently providing access to a current version of the remote service when functionality is requested via one or more prior interface versions for the remote service. Such enhanced access to software services may provide various benefits, such as by incrementally encouraging use of a current interface version that provides new functionality while continuing to support a prior interface version (e.g., based on what types of prior interface requests are accepted and adapted and what are not accepted, such as to allow the new functionality to be accessed only through the corresponding current version of the interface).

In at least some embodiments, the enhanced access to software services is provided at least in part by successively adapting each request to a service until the adapted request reflects the current version of the interface for service, such as by using changes from each successive prior version of the interface (e.g., from oldest version to newest version) to determine how to adapt the request. For example, a request for invocation of a method of version 1.1 of a first interface "Interface One" may be adapted to a current version (e.g., version 2.0) of the method of Interface One by adapting the request to use the method signature (e.g., a specification of the particular input and/or output parameters for the method in a specified order) that is expected by the current version, and then invoking the corresponding method of the current version of the first interface. As one example, if in version 1.1 a particular method used a particular parameter but in version 2.0 that parameter was dropped for that method, then a method call specified in accordance with version 1.1 that includes a value for the dropped parameter may be modified to not include the dropped parameter. In some embodiments, a supplied request may be adapted a number of times from an initial prior version of the method through one or more intermediate prior versions of the method until the request is successively adapted to the format expected by the current version of the method.

In some embodiments, one or more adapter components (also referred to as "adapters" herein, and in some embodiments each including adapter-specific software code) are provided for some or all versions of an interface to a software service. In particular, the interface versions for the software service may reflect a succession of interface versions from oldest to newest, and at least some such adapter components are each configured to adapt received requests for the service from a version of the interface corresponding to the adapter component to a next version of the interface in the succession, such as to allow an adapter component for the next interface version to successively adapt the request to the following version of the interface in succession. Accordingly, such adapter components may be arranged in a chain, such that each such adapter component is responsible for adapting the request for use by the next adapter component in the chain. A request for functionality for a service may be specified using an API for the service and may take many forms, for example, method or function calls, messages, remote procedure calls, remote method invocations, etc. Each adaptation by an adapter component modifies the request as appropriate so as to include a valid request signature expected by the next interface version in succession, culminating with a request that is formatted to be acceptable to the current version of the interface to the service. Such adaptation may include adjusting parameters, removing parameters, adding parameters, changing method names or other indications of an operation to be performed, etc. as appropriate to correspond to the expected interface version. Furthermore, in some embodiments and situations, a particular method's signature or other operation access definition may not change between two versions of an interface, but the underlying functionality corresponding to the method or other operation may change in the newer interface version. In at least some such embodiments and situations, an adapter component may similarly adapt invocations of that method or other operation that use the older interface version so that the older unchanged functionally corresponding to the older interface version is supplied for the invocations (e.g., by changing an invocation so that it accesses a separate older version of the method or operation that is maintained to support the older unchanged functionality for the older interface version, by modifying an invocation so that it accesses the newer version of the method or operation but with changed parameters or in another changed way so that the newer method/operation version provides the older unchanged version of the functionality, etc.). Thus, each adapted request is reflective of one or more of the changes made from that version of the interface to the next version. Additional details related to types of interface changes and corresponding types of request and response adaptations are included below.

Responses by a remote service to requests are similarly adapted in at least some embodiments. Thus, starting with a response generated by a service in accordance with requested functionality, such as in a format corresponding to the current version of the interface and service, the response is modified to be backwards compatible with each preceding version of the interface and service until the response is consistent with the interface version that was used by the request. In some embodiments, the request and response adapter component for a version of the interface may be combined in a single adapter component for that interface version, while in other embodiments each interface version may have multiple adapter components (e.g., distinct adapter components for requests and for responses). In addition, in some embodiments, some or all methods or other operations that are made available via a particular interface version may each have a distinct adapter component, while in other components at least some adapter components may each handle some or all operations for a particular interface version.

In some embodiments, requests from clients to an older interface version that attempt to specify newer functionality that is only available in more current versions (e.g., a new operation added to the current interface version) are refused, for example, by indicating an error condition to the clients. Such handling of requests encourages modification of the clients to use the current version of the interface in order to take advantage of newer functionality, as well as ensuring consistency for a particular interface version so that clients continue to receive the same functionality for that interface version even if related newer functionality in a newer interface version has changed. In other embodiments, such requests that specify functionality inappropriate for a corresponding interface version may be handled in other manners.

Furthermore, while in some embodiments the described uses of adaptation, adaptor components, and corresponding techniques are applied to manage multiple versions of an interface for a remote service, in other embodiments these techniques may be applied in other manners, such as to adapt requests and response between multiple distinct interfaces to a service (e.g., different interfaces to correspond to different types of communication technologies, different types of client devices, different types of client users, etc.), to adapt requests and responses for local services, etc.

FIG. 1 is a network diagram that illustrates an example of users interacting with a remote system that stores various data and provides various types of functionality, with embodiments of such a system able to use various of the described techniques for enhanced access to remote software services. In particular, in this example embodiment, the system storing the data is a task exchange system 115 that stores data related to tasks and to users who supply and/or perform the tasks, and that provides functionality related to performance of tasks. For illustrative purposes, some embodiments are described herein in which specific types of users interact with specific types of systems in specific ways, and in which the systems store specific types of data and provide specific types of related functionality, including specific types of techniques for enhanced access to software services. These examples are provided for illustrative purposes and are simplified for the sake of brevity, and the techniques disclosed herein can be used in a wide variety of other situations, some of which are described herein.

The task exchange system 115 may be implemented in various ways in various embodiments, such as in the form of a software system executing on one or more computing systems or devices (e.g., in a distributed manner, such as on a peer-to-peer or grid network). In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the system 115 may enable the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

In the example of FIG. 1, various task requester clients 120 interact with the task exchange system 115 in order to supply tasks that are available to be performed by others, as well as to perform other related activities. For example, in addition to supplying tasks, a task requester may interact with the system 115 to obtain results from the performance by other users of previously supplied tasks, to obtain information about an account of the task requester (e.g., information about financial payments made to other users for performing tasks supplied by the task requester, information about previously specified preferences, etc.), to search for information about tasks and/or about users who are available to perform tasks, to specify types of qualifications that users may need to perform supplied tasks, etc. Accordingly, the various task requesters 120 may interact with the task exchange system 115 by sending requests to the system 115 via services interface(s) 118, and by receiving corresponding responses as appropriate via the services interface(s) 118. If the task requesters 120 are interacting with the task exchange system 115 remotely, then the services interfaces(s) 118 may take the form of one or more remote services, such as Web services. The task requesters 120 may take various forms, such as a task requester user who interactively accesses the system 115 (e.g., via a GUI, or graphical user interface, displayed on a computing system of the task requester user, not shown, such as a GUI based on Web pages provided by the system 115 and/or based on execution of a client-side application on the computing system, with the Web browser and/or client-side application interacting with the interface(s) 118), or a software application that is programmatically interacting with the system 115 (e.g., via an API of the system 115, such as an API provided at least in part by the services interface(s) 118) on behalf of a related task requester user.

When a task requester supplies information about one or more tasks, the system 115 stores the task-related data as part of task information 145, which may then be made available to other users to perform the tasks in a manner specified by the task requester or otherwise determined by the system 115. The supplied information for a task may include a variety of types of information, including details related to the task (e.g., information to be analyzed, a question to be answered, etc.), one or more qualifications of any task performer user who performs the task, one or more geographical locations associated with the task, one or more capabilities and/or other current characteristics of one or more devices to be used as part of performing the task, one or more other criteria related to task performance (e.g., deadlines for completion, format of results from task performance, etc.), one or more associated rewards (e.g., monetary payments) to be provided to one or more task performer users who successfully perform the task, etc.

In this example embodiment, the system 115 stores various data across multiple alternative storage partitions, such that at least some types of data are stored only on a single partition. The system 115 may organize data based on users with which the data is currently associated, so as to store a group of data related to a particular user together on a particular storage partition. Thus, for example, when a particular task requester user supplies information about a new task, the system 115 determines an appropriate storage partition to store the information about the new task along with other information related to the task requester user. If the task requester is an existing user who already has information stored in a particular storage partition on a particular computing node, the system 115 may merely select that existing storage partition. Alternatively, If the task requester user is a new user or otherwise does not currently have an existing associated storage partition, the system 115 may determine an appropriate storage partition by considering one or more of a variety of types of information, such as about possible storage partitions, about the new user, and/or about other users that are related to the user.

As shown, the system 115 may include various alternative computing nodes 160 that store data related to task requester users, including example requester computing nodes 160a and 160n. As illustrated in detail with respect to requester node 160a, each requester node may include one or more storage partitions 165 that each store data related to one or more task requester users. Furthermore, in this illustrated embodiment, the computing node associated with a storage partition corresponding to a task requester user not only provides storage of data related to the task requester user, but also provides at least some of the system 115 functionality for the task requester user via an executing software program (not shown), such as to process and respond to various types of requests received from the task requester user. The computing nodes may have various forms in various embodiments, such as to each be a distinct physical computing system, to be one of one or more virtual machines hosted on a physical computing system, to include multiple physical computing systems working in concert, etc. In addition, in other embodiments storage partitions may have other forms, such as to be split across multiple computing systems and/or to be stored on dedicated storage devices that do not themselves provide additional computing capabilities.

Thus, when a task requester user supplies information about a new task, the task-related information may be stored together on a single storage partition with at least some other information specific to the task requester user. In this example, the various task information 145 for the system 115 is stored in a distributed manner across the partitions 165 of the requester nodes 160, although in other embodiments such task information may be associated with other users in at least some situations (e.g., to temporarily associate information about a task with a task performer user while the task performer user is performing the task).

As previously noted, various types of information other than about supplied tasks may also be associated with task requester users and grouped together on storage, including various administrative information (e.g., contact information, payment-related information, previously specified user preferences, etc.) and information about previous interactions with the user. Such user information may be supplied by the user and/or generated by the system 115, and is stored as user information 130 by the system 115 in this example. As is illustrated, such user information may be stored by the requester nodes 160 when the user information corresponds to task requester users, but may additionally be stored on task performer computing nodes 170 when the user information corresponds to task performer users. In a manner similar to the requester nodes 160, the system 115 may include various alternative task performer nodes 170, such as performer nodes 170a and 170m. As illustrated in detail with respect to performer node 170a, each performer node may include one or more storage partitions 175 that each store data related to one or more task performer users.

Thus, when a task performer user client 110 submits a request to or otherwise interacts with the system 115, the interaction is handled in a manner similar to that previously described with respect to the task requester users 120. The interaction may be, for example, to initiate performance of a specified task that is supplied by a task requester user, to obtain information about an account of the task performer (e.g., information about financial payments received from other users for performing tasks supplied by those other users, information about previously specified preferences, etc.), to search for information about tasks and/or about other users, to provide information about qualifications of the task performer user that may assist in performing various types of supplied tasks, etc. The task performer users 110 may similarly interact with the system 115 in various ways, such as via a GUI of the system 115 that is displayed on computing devices (not shown) of the task performer user or via a software program (not shown) that invokes services provided by services interface(s) 118.

As with requests from or other interactions by task requesters, after receiving a request from a particular task performer user, the system 115 determines an appropriate storage partition for the task performer user on one of the performer nodes 170, such as a first partition 175 on performer node 170a. For example, in embodiments in which at least some nodes may act as both requester nodes and performer nodes (or in which distinctions are not made between requester nodes and performer node, such that there is merely a group of computing nodes that may each store requester-related and/or performer-related data), the data for the new task performer user may be co-located on a particular storage partition with the data for one or more related task requester users who supply types of tasks for which the task performer user has an affinity.

After determining the appropriate storage partition for the task performer user, the system 115 transfers control of handling the task performer user's interaction to the computing node associated with the storage partition. For example, if the interaction is a request by the task performer user to perform a specified task supplied by a task requester user, the computing node associated with the task performer user's storage partition may interact with the computing node associated with that task requester user's storage partition to retrieve information about the task to be performed, such as under control of a software program (not shown) that is executing on the computing node associated with the task performer user's storage partition in order to provide some of the functionality of the system 115. In so doing, in some embodiments, the task information may be temporarily associated with the task performer user's storage partition while the task is being performed, while in other embodiments the task information may remain associated with the task requester user's storage partition but otherwise provide access to the information for the task performer user. After the task performer user performs the task (which may involve the task performer user supplying information and/or performing offline activities external to the system 115 and the task performer user's computing device), information about the results of the task performance may be stored in the task performance user's storage partition, and then made available to the task requester user in various ways; for example, by automatically forwarding them to the task requester, supplying them to the task requester when the task requester user requests them (e.g., via services interface(s) 118), etc. The aggregate task performance results information from the various task performer users then provides the task performance results information 150 for the system 115.

Thus, the example system 115 stores various types of data and provides various types of functionality to clients (e.g., via services interface(s) 118), which in this example embodiment are task performer users and task requester users acting as clients of the system 115. In at least some embodiments, the services that are provided via services interface(s) 118 are Web services whose interfaces may be specified in various manners, for example by defining an interface using a WSDL (Web Services Description Language) specification. Access to such interfaces may be implemented in various ways, such as via HTTP and/or SOAP or similar remote method invocation or message calling mechanism.

As mentioned, services and their interfaces, such as services interface(s) 118, may evolve over time, and in at least some embodiments one or more computing systems implementing the task exchange system 115 of FIG. 1 may support multiple interface versions for one or more services. In some embodiments, an interface adaptation manager system is implemented to provide access to multiple versions of one or more of such interfaces, such as in a manner that is transparent to clients, and is discussed in greater detail elsewhere. In particular, some embodiments provide interface adapter components which may be chained together to adapt requests and responses from one version of a service interface to another version of the same service. Accordingly, these chained adapters provide a type of "pipeline" for processing requests and responses until they are transformed into a format acceptable to a particular version. Other embodiments may provide chained interface adapters for other purposes and/or that provide different behaviors, such as adapting requests from one version of a service interface to a distinct interface to either the same or a distinct service, thereby providing a type of "translation" between services.

Figure 2:
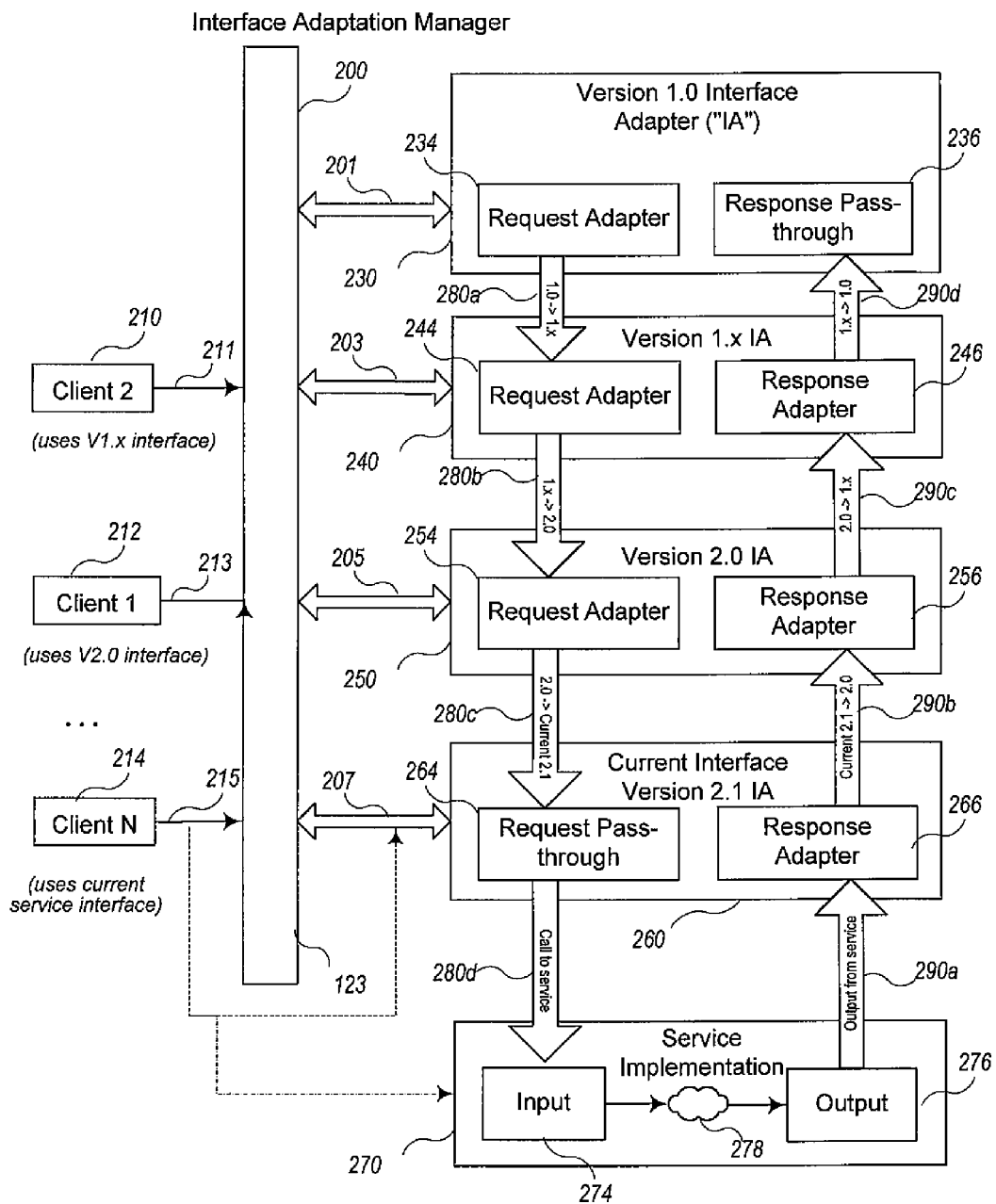
FIG. 2 is a block diagram illustrating an example embodiment of a software service interface adapter arrangement that provides support for multiple versions of an interface to a software service.

In one example embodiment, an interface adaptation manager system routes requests for one or more software services to an interface adapter component corresponding to interface versions used for the requests (e.g., an initial version of an interface of a service) and to route resultant responses to appropriate clients that initiated the requests that resulted in the particular resultant responses. FIG. 2 illustrates an example embodiment of a software service interface adapter arrangement for providing support for multiple versions of an interface to a particular software service, such as a Web service. FIG. 2 also shows interactions that occur in an interface adapter component chain in response to client requests for a software service, and when distributing responses from the software service back to requesting clients.

In particular, FIG. 2 illustrates an example embodiment in which example clients client 1 (212), client 2 (210), and client N (214) are making requests to a software service 270, which in this example embodiment supports three prior versions in addition to the current version. Each of the four service versions has a distinct version of the service interface in this example embodiment, and an example embodiment of an interface adaptation manager system 200 is provided to manage use of the multiple interface versions. In particular, the interface adaptation manager receives the various requests, which each designate or otherwise correspond to a particular version of the interface for software service 270, and forwards each request to an interface adapter component corresponding to the interface version for that request. For example, client 2 (210) is shown requesting functionality (e.g., one or more operations) using version 1.x of the interface to service 270; client 1 (212) is shown requesting functionality using version 2.0 of the interface to service 270; and client N (214) is shown requesting functionality using the current interface version to service 270. Such a scenario may occur when, for example, the functions available via service 270 have changed over time such as, for example, to include additional capability (e.g., methods/messages and/or parameters), and the corresponding interface definitions (e.g., WSDL-based definitions) have change to reflect the service changes. The interface adaptation manager 200 is shown in this example as being connected via one or more communication mechanisms 201, 203, 205, and 207 to multiple interface version adapter components 230, 240, 250, and 260, which have been chained together to provide requests to and responses from the current service implementation 270. The interface adaptation manager 200 may be a separate component that contains program code (e.g., an instance of an interface adaptation manager object), or may be an abstraction of code contained elsewhere in the server computing system that implements the service.

When a request arrives at an interface adapter component, such as one of adapter components 230, 240, or 250, it is modified (e.g., translated, reformatted, reprogrammed, etc.) so as to adapt the request to the next version of the interface, and then passed to the next interface adapter component in the request adaptation chain 280 that corresponds to that next interface version. For example, when client 2 (210) makes a request 211 (e.g., a communication which indicates a particular operation to be performed or method to be invoked) to an interface version 1.x of the software service implementation 270, the interface adaptation manager 200 routes the request using communications path 203 to the adapter component that corresponds to the version 1.x interface, namely interface adapter component 240. Once it receives request 211, the interface adapter component 240 uses its request adapter component 244 to adapt the request 211 to a format suitable for the next adapter component in the chain, namely interface adapter 250 corresponding to version 2.0 of the service interface. The adapted request 280b, which is in a format suitable for interface adapter 250, is then forwarded to interface adapter 250 for further processing.

In the illustrated embodiment, each interface adapter component is responsible for adapting requests from the corresponding version of the interface to a next newer version of the interface, and then forwarding the adapted request to the next interface adapter component in the chain (e.g., that corresponds to the next newer version of the interface) until the request has been adapted to the current interface version, so that the current implementation of the service may be invoked to process the request without further adaptation. In other embodiments, adapter components could be structured and used in other manners, such as to similarly have chains of adapter components, but with the requester adapter component for a particular version of the interface instead being configured to receive requests in a format corresponding to a prior version of the interface and to then adapt the received requests to the particular interface version before forwarding it on to the next adapter component in the chain.

Continuing the example, when interface adapter component 250, which corresponds to interface version 2.0, receives request 280b in the format corresponding to the interface version 2.0, request adapter component 254 then adapts request 280b to a format suitable for the next interface version. In this example, the next interface version is version 2.1, which is the current interface version for the service 270, so request adapter component 254 forwards the adapted request 280c (which has been adapted to the format corresponding to the current interface version 2.1) to the next adapter component in the chain, which is interface adapter component 260. At this point, since interface adapter component 260 corresponds to the current interface version, no further adaptation is needed for the request, and the interface adapter component 260 passes the received request through without modification to the software service 270 as request 280d, which then invokes or otherwise initiates corresponding functionality of service 270 using the request 280d as input 274. In the illustrated embodiment, the interface adapter component 260 includes a request adapter component 264 which merely passes the adapted request through without modification, but in other embodiments may not include any requester adapter component 264 or may include a requester adapter component 264 that performs other options (e.g., performs various predefined pre-processing even for requests specified in accordance with the current interface version).

Once the request is processed by the software service, a generated resultant response is then passed back down the response adaptation chain 290 to the interface adapter component that originated the request, which in this example was interface adapter component 240 corresponding to version 1.x. In a similar manner to the adaptation of the request, the response is successively adapted by the interface adapter components in the chain so as to successively correspond to each intermediary interface version supported by the chain of adapters. For example, as part of performing an operation that corresponds to request 280d, the service implementation 270 in the example embodiment performs code 278 using input 274 so as to generate output 276. Output 276 is forwarded via response 290*a* to response adapter component 266 of the interface adapter component 260 corresponding to the current interface version of the service, with response 290*a* being provided in a format corresponding to the current interface version 2.1. Response adapter component 262 adapts the response 290*a* so that it corresponds to the prior interface version (in this example, version 2.0), and then forwards adapted response 290*b* to the next interface adapter component 250 in the chain 290 (which is the interface component that corresponds to the prior interface version in the succession from oldest prior interface version to current interface version). The response adapter component 256 of interface adapter 250 receives and adapts response 290*b* to adapted response 290*c*, which is in a format corresponding to version 1.x, and then forwards adapted response 290 to interface adapter component 240 that corresponds to version 1.x. Since interface adapter component 240 corresponds to the interface version designated by Client 2 in the initial request 211, and thus Client 2 expects to receive a response in a format corresponding to version 1.x, the response is not adapted for any prior interface versions or forwarded to any additional interface adapter components corresponding to any such prior interface versions. Instead, the adapted response 290*c* in the format corresponding to interface version 1.x is returned to the client 2 (210) via interface adaptation manager 200 and communication mechanism 203. In other embodiments, response adapter 266 could instead be a pass through component, and the response adapter components 256 and 246 could instead each receive responses in the format for the interface version corresponding to the prior interface adapter component in the chain 290 (the next interface version in the succession from oldest to newest) and adapt the response to the format for the interface version corresponding to their interface adapter components.

In a similar manner, the request 213 from client 1 is specified in accordance with interface version 2.0, and the interface adaptation manager provides the request to interface adapter component 250 via communication mechanism 205. In a manner similar to that described with respect to request 211 from client 2, the request adapter component 254 will adapt the request to the format corresponding to interface version 2.1, and forward the adapted response 280*c* to request adapter component 264 of the next interface adapter component 260 in the chain 280, which will then pass the request through to the service 270 for processing. The resulting response will be forwarded along the response chain 290 to interface adapter component 250 so as to be successively adapted until the format corresponding to version 2.0 is reached (in this example, with only a single adaptation being performed by response adapter component 266), and then provided to client 1 in that format via communication mechanism 205. Thus, by using a version of the interface that is closer to the current interface version than was used by client 2, client 1's request and response do not undergo the adaptations by request adapter component 244 and response adapter component 256, which may cause the response to be received more quickly and with less computing resources of the provider of the service 270 being used.

Client N may similarly specify a request 215 in accordance with current interface version 2.1, and the interface adaptation manager provides the request to interface adapter component 260 via communication mechanism 207 for handling in a manner similar to that previously discussed. Furthermore, in the illustrated embodiment, a client such as client N may in at least some situations be allowed to directly request an operation via the current interface version without interacting with the interface adaptation manager, such as by directly interacting with the current version interface adapter component 260 (shown as a dashed line) and/or by directly interacting with the current service implementation 270 (shown as a dot-dashed line). In such embodiments, corresponding responses may be similarly provided directly to client N without use of the interface adaptation manager system. If so, such direct functionality access may provide various benefits, such as faster responses to the client and/or less use of computing resources by the provider of the service 270. Other arrangements may also be supported in other example embodiments or with modifications to the described embodiment.

The adaptations that may be performed by each adapter component may be of various types in various embodiments. In one such example embodiment, it is desirable to discourage the use of older versions of an interface, while still supporting equivalent functionality of the older versions. In order to accomplish this motive, each adapter component corresponding to a prior interface version may validate received requests against the functionality available in that corresponding prior interface version. When a request is specified for a particular interface version but requests functionality not offered until a later (more recent version), the adapter component may refuse the request, such as by generating an error condition. One mechanism for implementing such behavior is through the use of "blacklists" of functionality, which let an adapter component know which operations (e.g., functions, methods, messages, etc.) are not supported by the corresponding version of the interface (e.g., a blacklist that reflects new functionality added to the next version of the interface).

In addition, adapter components may need to adapt a request format to a format for a next interface version in the succession if, for example, an operation in the corresponding interface version continues to be available in the next interface version, but is changed in one or more relevant manners (e.g., the parameters, values, ordering, etc.). In that instance, when the interface adapter component is generated, differences between the interface version corresponding to the interface adapter component and the next interface version in the succession are identified, and the adapter component is configured to modify the request to accommodate those changes. For example, when new parameters are added to an existing operation in the next interface version, the adapter component corresponding to the interface version prior to that next interface version may refuse received requests that use the new parameter, such as by using a blacklist to deny the request similar to the blacklist used to detect a new operation. If the received request specifies parameters in accordance with the existing operation in the prior interface version, the adapter component may in at least some cases generate a value for the new parameter as part of the adaptation of the received request, such as by using default parameter values. One such example is when a service has added mandatory parameters that were not mandatory for the interface version corresponding to the adapter component (e.g., where optionally allowed in the prior interface version, were not allowed in the prior interface version, were specified in a different manner in the prior interface version, etc.).

In addition, when input parameters that were present for an operation in a prior interface version have been removed for the operation in a next version of the interface, a request may be adapted by the adapter component for the prior interface version to reflect the removed parameters. For example, in some situations, in may be appropriate to adapt the request by removing any values specified for the removed parameter.

Alternatively, if the software service continues to support the prior version of the service in which the removed parameter is used, the request may be adapted by passing a value specified for the removed parameter along in the adapted request but in a manner that is designated to be ignored by subsequent adapter components (e.g., by tagging or otherwise flagging such parameter values, such as with an indication of the prior interface version to which to parameter values correspond). In this manner, the subsequent adapter components will continue to pass the designated removed parameter values along, and the software service will eventually receive the designated parameter values and use them as part of providing the prior version of the service. Such removed parameters, also referred to as "ghost" parameters, may further be handled in various ways by subsequent adapter components in at least some embodiments and situations. For example, if a later version of the interface adds back such a previously removed parameter, then a blacklist rule may be created to reject such a request.

When an operation present in a prior interface version is removed in a next version of the interface, a request may be adapted by the adapter component for the prior interface version to reflect the removed operation in a similar manner to that for removed parameters. For example, the request may be adapted to instead invoke one or more other substituted operations available in the next interface version, such as if the substituted operations provide similar functionality. Alternatively, the specification of the removed operation may similarly be designated as a "ghost" operation in the adapted request, such as to be passed along to the software service to provide functionality corresponding to the prior interface version.

Output parameters may be handled similarly, including for output parameters that are added, removed or otherwise changed from a prior version of the interface to a next version of the interface. For example, if a more recent version of the interface returns an output value that was not used for a prior interface version, then it may be desirable to remove or otherwise "blacklist" the newer output value in the adapted response. Alternatively, if a more recent version of the interface does not return an output value that is expected by a prior interface version, such as for an output value removed from the more recent interface version, the response adapter component may generate an output value (e.g., by using a default value) or otherwise create a "ghost" value to carry through the response chain. Other logic also may be implemented.

Thus, chains of adapter components may be used to successively adapt requests and/or responses to correspond to a succession of versions of an interface. In addition to providing various benefits with respect to handling requests corresponding to multiple versions of an interface, the use of such adapter components may provide significant benefits when generating a new version of a software service and a corresponding interface adapter component, such as part of a software development process before the new software version is executed to handle requests from clients. In particular, adding a new current interface version may only entail adding a request adapter component to adapt requests specified in accordance with the previous current interface version to the new current interface version and adding a response adapter component to adapt responses specified in accordance with the new current interface version to the previous current interface version, such as to accommodate changes between the previously current interface version and the new current interface version.

Figure 3:
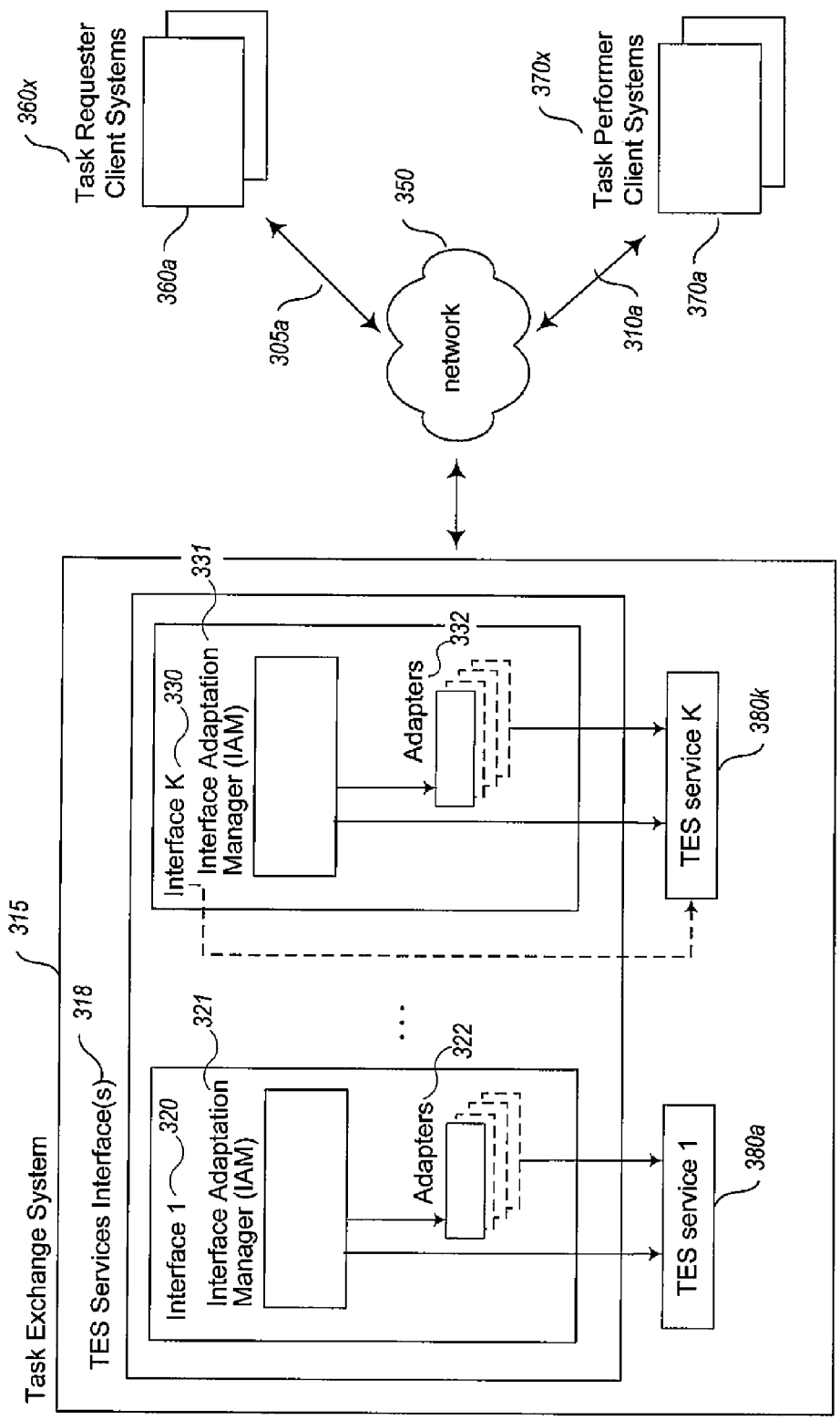
FIG. 3 is a block diagram illustrating an example environment that uses an example software service interface adaptation mechanism to support multiple versions of an interface for each of one or more software services.

The interface adapter arrangement for providing support for multiple versions of an interface to a software service as illustrated in FIG. 2 may be incorporated to support remote services for various types of software services and systems, including a task exchange system such as that illustrated in FIG. 1. FIG. 3 illustrates an example environment that uses the example software service interface adaptation mechanism demonstrated in FIG. 2 to provide multiple versions of interfaces of one or more services of an embodiment of the task exchange system to one or more client systems.

In particular, an example task exchange system 315 is shown in FIG. 3 providing one or more services 380a and 380k, with one or more corresponding interfaces 320 and 330 (Interface 1 and Interface K) as part of the TES services interfaces 318. Each such software service interface 320 and 330 is shown using a separate interface adapter chain in the example embodiment of FIG. 3, although other arrangements are contemplated. Such services and their interfaces may provide one or more operations related to supplying tasks to be performed for request by one or more task requester client systems 360x and/or one or more operations related to the performance of tasks for request by one or more task performer client systems 370x. For example, task requester client system 360a may request an operation 305a of the task exchange system 315 via network 350 (e.g., to supply a task that is available to be performed), and a generated response may be subsequently returned to the requester system 360a (e.g., results of performance of the task, an indication that the supplied task has been made available for performance, etc.). Similarly, task performer client system 370a may request an operation 310a of the task exchange system 315 via network 350 (e.g., to initiate performance of a particular task, to supply results of performance of a task, etc.), and a generated response may be subsequently returned to the performer system 370a (e.g., a confirmation of the action being performed).

After a request to the TES services interface 318 is received for a particular service, the interface adaptation manager of the corresponding interface for that service is invoked with the received request. For example, a request 305a from task requester client system 360a may result in invocation of the interface adaptation manager 321 of interface 320, so as to forward the request 305a to one or more interface adapters 322 that adapt the request to correspond to the current implementation of TES service 1 380a. The TES service 1 380a then generates and returns a corresponding response (not shown), which is adapted as needed and returned to the TES services interface 318, which in turn forwards the adapted response back to the requesting client system 360a via network 350.

For ease of illustration, the interfaces 320 and 330 (Interface 1 and Interface K), their associated interface adaptation managers 321 and 331, and interface adapters 322 and 332 are shown as part of the TES services interface 318 in this example embodiment, such as to "reside" in or be otherwise implemented by the task exchange system 315. However, it is to be understood that, since the task exchange system may be distributed and/or implemented by multiple computing systems, including one or more requester nodes and one or more performer nodes, the TES interfaces 318, including interfaces 320 and 330, may actually be implemented and/or reside on one or more of such requester nodes or performer nodes. In addition, one or more of the implementations of TES service 1 380a and TES service K 380k may be implemented by multiple computing systems, including one or more of the requester nodes or performer node. Furthermore, in some embodiments the functionality of such interface adaptation manager systems may be provided by a third-party and made available for use with the task exchange system and/or one or more other systems, such as for a fee. Accordingly, the abstraction illustrated in FIG. 3 may be implemented by a wide variety of computing system configurations.

For example, referring to FIG. 1, implementations of the TES service 1 and TES service K (380a and 380k) may be provided by the example task exchange system 115 as part of the services interface(s) 118 in a distributed manner by one or more requester nodes 160a-160n and/or by one or more performer nodes 170a-170m. In addition, in at least some embodiments, the requester nodes 160 may perform various interactions between themselves, and the performer nodes 170 may perform various interactions between themselves, although such interactions are not illustrated here. Furthermore, such interactions may in at least some embodiments be part of providing the TES services interface 118 and/or 318. In this manner, various computing nodes of the system 115 may interact in various ways by accessing services and/or interfaces provided by other computing nodes, and thus provide and/or receive various functionality of the task exchange system.

In this example embodiment, the techniques for enhanced access to remote services are provided and used by a task exchange system. By enabling large numbers of unaffiliated or otherwise unrelated task requesters and task performers to interact via the intermediary task exchange system in this manner, free-market mechanisms may be used to efficiently perform tasks with location-based and/or device-based criteria regarding task performance. Additional details related to examples of interactions of users with particular embodiments of task exchange systems are included in pending commonly-owned U.S. patent application Ser. No. 10/990,949, filed Nov. 16, 2004 and entitled "Providing an Electronic Marketplace to Facilitate Human Performance of Programmatically Submitted Tasks," and in pending commonly-owned U.S. patent application Ser. No. 11/396,286, filed Mar. 31, 2006 and entitled "Facilitating Content Generation Via Messaging System Interactions," each of which is hereby incorporated by reference in its entirety. Nonetheless, it will be appreciated that the described techniques may further be used with a wide variety of other types of systems and in other types of situations.

Figure 4:
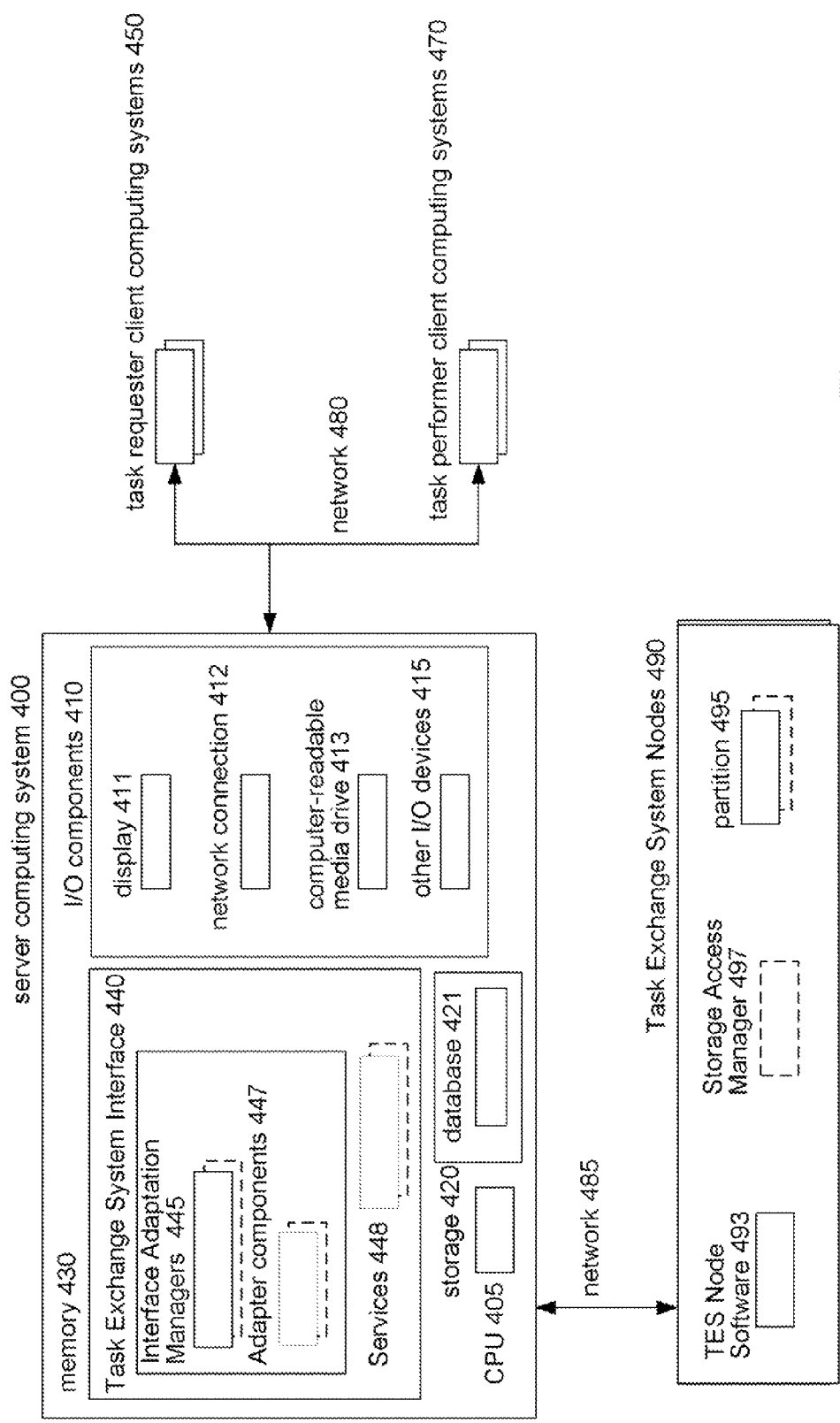
FIG. 4 is a block diagram illustrating example computing systems suitable for implementing multiple interface version support for software services.

FIG. 4 is a block diagram illustrating example computing systems suitable for providing enhanced access to software services, such as via support for multiple interface versions. In particular, FIG. 4 illustrates a server computing system 400 suitable for executing an embodiment of an interface to a task exchange system, as well as various task requester client computing systems 450, task performer client computing systems 470, and other computing nodes 490 that support the task exchange system. In the illustrated embodiment, the server computing system 400 has components that include a CPU 405, various I/O components 410, storage 420, and memory 430. The I/O components include a display 411, a network connection 412, a computer-readable media drive 413, and other I/O devices 415 (e.g., a mouse, keyboard, etc.). The other computing systems 450 and 470 and the computing nodes 490 each may include similar components to those of the server computing system, but are not illustrated in detail here.

An embodiment of an interface portion of a task exchange system 440 is executing in memory 430, and it interacts with the client computing systems 450 and 470 over a network 480 using the network connection 412 (e.g., via the Internet and/or the World Wide Web, cellular network, etc.). In particular, users of task requester client computing systems 450 may interact with the system interface 440 in order to provide information about available tasks to be performed, as well as to perform other related interactions. Similarly, task performer users may use task performer computing systems 470 to interact with the system interface 440 to obtain information about available tasks and provide task performance results information, as well as to perform other related interactions.

The illustrated embodiment of the system interface 440 further includes one or more interface adaptation manager systems 445 and corresponding adapter components 447 to support one or more versions of one or more interfaces for services 448. In the illustrated embodiment, the services 448 are shown as executing in memory 430, but in other embodiments may be provided in other manners, such as via services (not shown) provided by computing nodes 490 (e.g., services implemented by an executing software component 493). Furthermore, while not illustrated here, in some embodiments one or more other software components may be provided to facilitate creation of adapter components, such as when a new current version of a software service and corresponding interface are created (e.g., by automatically analyzing differences between interface versions and automatically generating some or all of corresponding adapter components).

As previously described, for at least some interactions initiated by the client computing systems 450 and 470, the system interface 440 responds by identifying an appropriate storage partition for a user associated with the interaction, and then directs a computing node associated with that storage partition to handle the interaction. In particular, in this example, the server computing system 400 is connected to multiple task exchange system alternative computing nodes 490 via another network 485 (e.g., a network internal to the task exchange system, such as when the computing nodes 490 are not directly accessible to external computing systems such as computing systems 450 and 470). Each of the alternative computing nodes 490 includes at least one storage partition 495 to store data for one or more types of users, and access to such storage partitions may be managed in some embodiments by an optional storage access manager component 497 executing on the computing node. While not illustrated in detail here, in some embodiments the computing nodes 490 may instead be of varying types (e.g., separated into requester nodes and performer nodes, such as to support different types of functionality corresponding to those types of users; separated by offering different types or levels of capabilities, such as if some computing nodes support higher levels of quality of service and/or include additional capabilities for use by premium customers; etc.).

When one of the computing nodes 490 is directed to handle an interaction with a user, or in response to other types of events, one or more software programs 493 executing on that computing node may perform various actions in response. For example, at least some of the computing nodes 490 may each provide one or more services that are available to other computing nodes 490, and in some situations the software program(s) 493 may invoke or otherwise interact with one or more remote services on other computing nodes as part of the response to the user interaction or other event. If so, as discussed in greater detail elsewhere, one or more interface adaptation managers 445 and/or adapter components 447 may be invoked to adapt a request for a remote service or a response generated accordingly.

In addition, in at least some embodiments and for some types of interactions, the system interface 440 may directly handle the interactions without directing the interactions to particular computing nodes 490. For example, the task exchange system may maintain some types of data in a general data store that is not distributed among the computing nodes 490, such as in a database 421 on storage 420. If so, the system interface 440 may respond to requests to access or change such data directly without using the computing nodes 490. As described elsewhere, the system interface 440 may provide enhanced access to the services 448 in at least some embodiments by supporting multiple versions via the adaptation managers 445 and the adapter components 447. In other embodiments, such general data may not be maintained and used. Furthermore, in some embodiments, the system interface 440 and/or other portions of the task exchange system may optionally be separated into multiple components that each provides one or more distinct types of functionality, although particular such components are not illustrated in this example embodiment.

It will be appreciated that computing systems and nodes 400, 450, 470 and 490 are merely illustrative and are not intended to limit the scope of embodiments of the present disclosure. The task exchange system may instead be executed by multiple interacting computing systems or devices, and computing system 400 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware, firmware, or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange system and by the interface adaptation manager system may in some embodiments be provided via various components, and may be combined in fewer components or distributed in additional components than those described herein. Similarly, in some embodiments, the functionality of some of the components may not be provided as part of the task exchange system or the interface adaptation manager system, and/or other additional functionality may be available. As one particular example, in some embodiments an interface adaptation manger system may be implemented in a distributed manner by using multiple interface adaptation manager objects that each represents a remote software service or an operation corresponding to a remote software service.

It will also be appreciated that, while various items are discussed or illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 5:
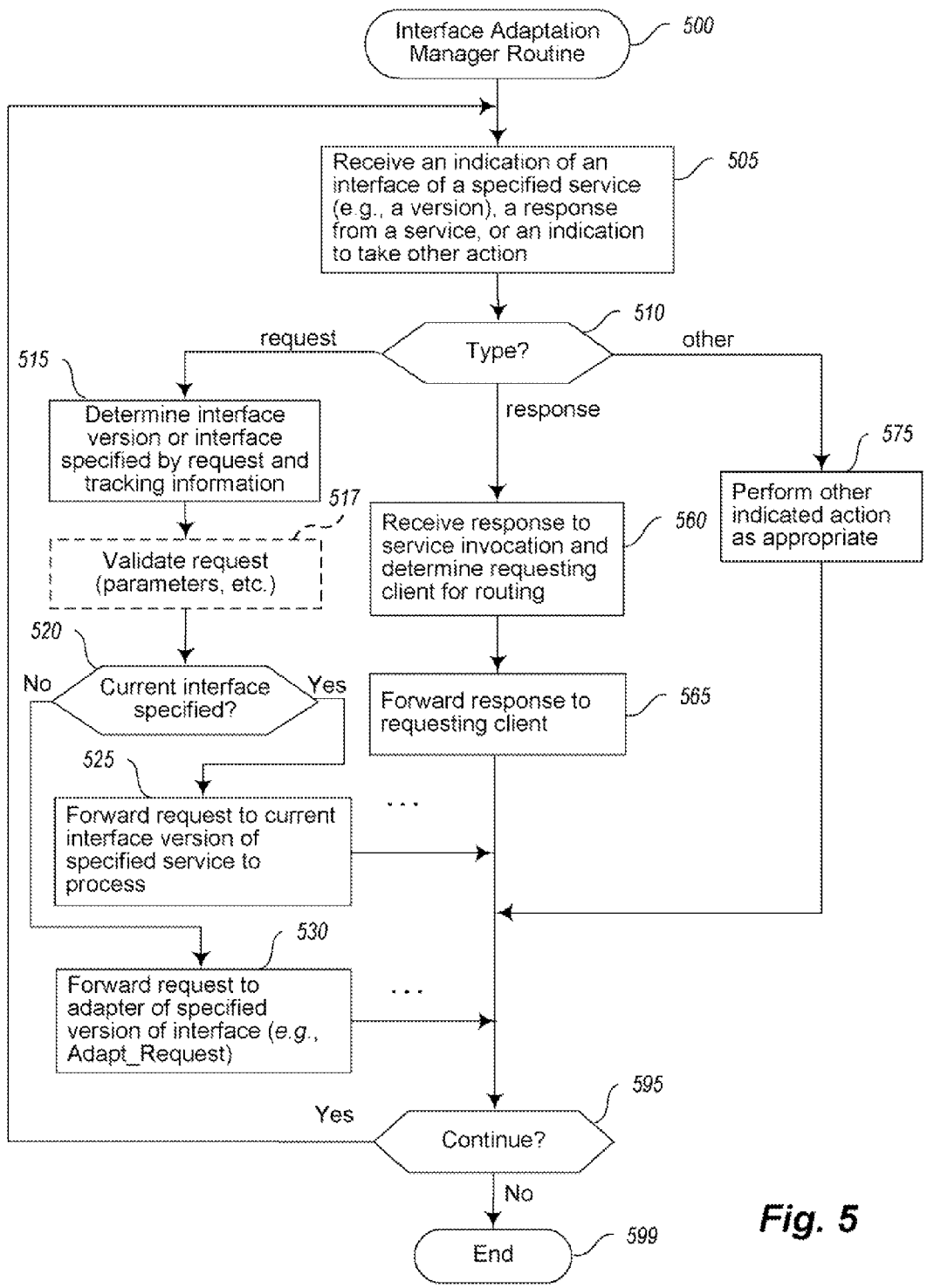
FIG. 5 is a flow diagram of an example embodiment of an interface adaptation manager routine.

FIG. 5 is a flow diagram of an example embodiment of an Interface Adaptation Manager routine 500. The routine may be provided by, for example, execution of an interface adaptation manager system 200 of FIG. 2 and/or of the interface adaptation manager systems 321 and 331 of FIG. 3, such as to provide enhanced access to multiple interface versions or multiple interfaces of remote software services. While the illustrated embodiment of the routine may enhance access to multiple versions of a single remote software service or a single operation provided by a remote service, in other embodiments a similar routine may be performed to route and distribute requests to and responses from multiple remote software services.

The illustrated embodiment of the routine 500 begins at block 505, where an indication is received of an invocation of an interface for a specified software service (e.g., by an executing software program, such as a software program executing locally or instead from a remote software program), of a response received from a remote service to a prior interaction, or an indication of other data or other action to take. The routine continues to block 510 to determine the type of received indication, and continues to block 515 if it is determined that an indication was received of an invocation of or other initiated interaction with an interface of a specified software service. In block 515, the routine determines which version of the interface to the specified service (or which of multiple interfaces to the specified service) has been designated, and any additional tracking information that is used, such as data structures for storing ghost parameters, blacklist structures etc. According to one example embodiment, the routine continues in block 517 to determine whether the indicated request is a "valid" one based on the designated interface version, and if so continues in block 520, or otherwise executes a suitable error handling mechanism (not shown), such as to generate an error. Alternatively, such validation, if performed, may instead be handled by each individual interface adapter component routine as described below. In block 520, the routine then determines whether the indicated request is specified using the current version of the interface (in which case no adaptation is used) or a prior version of the interface.

If the request specifies the current interface version, then the routine continues to block 525 to forward the (unadapted) request to the current interface version of the specified service in order to process a requested operation. Otherwise, the routine continues to block 530 to forward the request to an initial interface adapter component that corresponds to the version of the interface specified in the request. As described elsewhere, this initial interface adapter will then adapt and forward the adapted request as appropriate to a next adapter component in succession until the request is adapted to the current version of the interface of the requested service. An overview of an example adapter component routine for adapting a request from an older prior interface version to a newer interface version is described relative to FIG. 6.

If it was instead determined in block 510 that the type of received indication in block 505 was a response from a remote software service to a prior operation requested from the remote service, the routine continues to block 560 to receive the corresponding response. In the illustrated embodiment, the received response is in a format corresponding to a version of the interface used for the prior request that resulted in the response, such as after being adapted by one or more response adapter components. An overview of an example adapter component routine for adapting a response from a version of an interface to a prior interface version is described relative to FIG. 7. The routine then continues to block 565 to forward the received response to the software program or other client that initiated the prior associated request.

If it is instead determined in block 510 that the type of received indication in block 505 was of another form, such as an indication of other received data or to take other action, the routine continues to block 575 to respond to the received indication as appropriate (e.g., to take a specified action if appropriate). Such other indications may be of various types in various embodiments, such as a request to update an interface adapter chain to provide an additional interface adapter in the chain, an expiration of a timer or other indicator to retry a prior interaction that failed, a request from an administrator to perform an administrative operation, etc. After blocks 525, 530, 565 or 575, the routine continues to block 595 to determine whether to continue. If so, the routine returns to block 505, and if not continues to block 599 and ends.

The illustrated embodiment of the routine may perform other actions in other embodiments. For example, while not illustrated here, in other embodiments the routine may provide responses or other status messages to a software program or other client from who an indication is received in block 505, such as immediately in response to the receipt of the indication in block 505, after blocks 525 and/or 530 even if a response is not received (e.g., to indicate that the interactions have occurred), etc. In addition, in at least some embodiments, various interactions with adapter components may be performed, such as to add or remove support for particular versions of the interface. It will further be appreciated that the task exchange system and/or interface adaptation manager system may have other components that provide a variety of other types of functionality as part of their operation, but that are not described in detail here.

Figure 6:
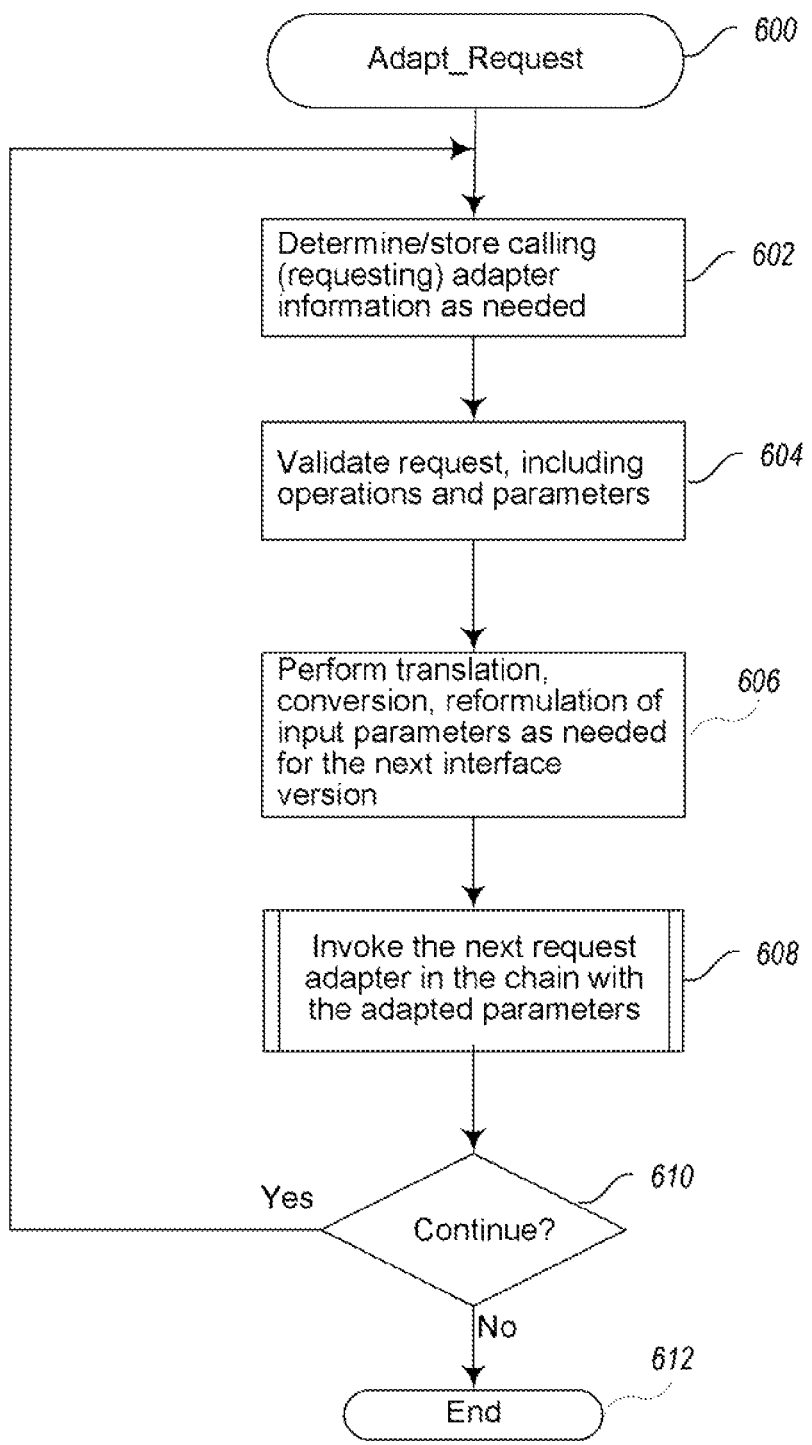
FIG. 6 is a flow diagram of an example embodiment of an interface adapter routine for adapting a received request.

FIG. 6 is a flow diagram of an example embodiment of an interface adapter component routine 600. The routine may be provided by, for example, execution of a chain of one or more request adapter components 234, 244, 254, 264 of FIG. 2 and/or of one or more request adapter components 322, 332 of FIG. 3 and/or of one or more request adapter components 447 of FIG. 4, such as to adapt a request for a software service to a current version of the interface to the software service.

The routine begins in block 602 to receive a request specified in accordance with a version of the interface, such that the routine is currently being performed on behalf of the adapter component corresponding to that interface version. Thus, when use of a chain of multiple adapter components is first initiated for a received request that designates a particular prior interface version, the routine will initially be invoked on behalf of the adapter component that corresponds to that prior interface version (which is the oldest interface version in the chain). As described below and elsewhere, additional adapter components in the chain may be subsequently invoked, such as in a recursive manner in this example embodiment. Information about the interface version for the current corresponding adapter component may be determined and stored in this example embodiment, such as to assist in later providing a corresponding response to the received request. The routine then continues to block 604 to optionally validate the request, such as by determining whether a requested operation and corresponding specified parameter values are permitted in the interface version corresponding to the current adapter component, and if not the request may be denied (not shown). The routine then continues to block 606 to perform any indicated adaptation of the received request for the corresponding adapter component so that the adapted request corresponds to a next interface version in the chain, such as to translate operations, parameters, values, ordering, etc. and/or to designate ghost operations and/or parameters (e.g., based on one or more predefined rules for the corresponding adapter component). For example, such rules may be provided by an adapter component using string search and replacement tools, such as XSLT, the "grep" command in Unix and Unix-like systems, etc. Once the request has been appropriately adapted for the next interface version, the routine continues in block 608. In block 608, the routine invokes the next request adapter component in the chain (or the actual requested software service if performed for the adapter component corresponding to the current interface version, not shown), which in the illustrated embodiment involves passing the adapted request to a new instance of the same routine that corresponds to the next adapter component in a recursive manner. Thus, until the routine is executed on behalf of the adapter component for the current interface version and the request has been adapted to the current interface version, each adapter component in the chain will successively adapt the request and then forward it to a next adapter component in the chain. The routine then continues to block 610 to determine whether to continue. If so, the routine returns to block 602, and if not continues to block 612 and ends.

Figure 7:
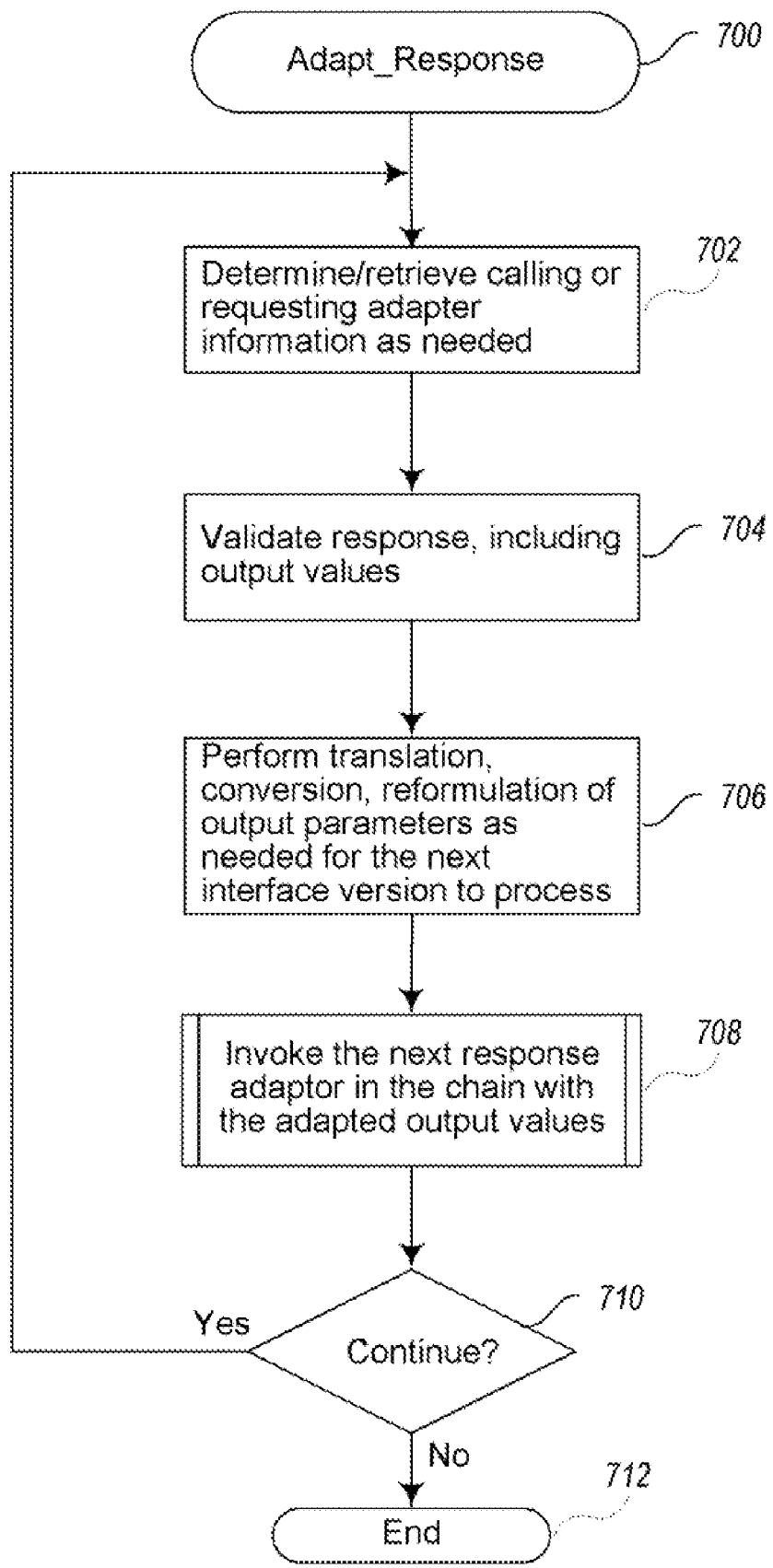
FIG. 7 is a flow diagram of an example embodiment of an interface adapter routine for adapting a received response.

FIG. 7 is a flow diagram of an example embodiment of an interface adapter component routine 700. The routine may be provided by, for example, execution of a chain of one or more response adapter components 236, 246, 256, 266 of FIG. 2 and/or of one or more response adapter components 322, 332 of FIG. 3 and/or of one or more response adapter components 447 of FIG. 4, such as to adapt a response received for a request to a version of the interface to the software service that corresponds to the request. The routine operates in a manner previously discussed with respect to the routine illustrated in FIG. 6 for adapting requests.

The routine begins in block 702 to receive a response specified in accordance with a version of the interface, such that the routine is currently being performed on behalf of the adapter component corresponding to that interface version. Thus, when use of a chain of multiple adapter components is first initiated for a received response, the routine will initially be invoked on behalf of the adapter component for the current interface version (which is the newest interface version in the chain). As described below and elsewhere, additional adapter components in the chain may be subsequently invoked, such as in a recursive manner in this example embodiment. Information about the interface version for the current corresponding adapter component may further be determined and stored in this example embodiment, such as to assist in providing the adapted response to the client that made the corresponding request. The routine then continues to block 704 to optionally validate the response, such as by determining whether one or more response values are supported in the interface version for the current adapter component, and if not the response value may be removed before the response is forwarded. The routine then continues in block 706 to perform any indicated adaptation of the received response for the corresponding adapter component so that the adapted response corresponds to a preceding interface version in the chain, such as to translate parameters, values, ordering, etc. and/or to designate ghost parameters (e.g., based on one or more predefined rules for the corresponding adapter component). For example, such rules may be provided in a manner similar to that described for processing requests. Once the response has been appropriately adapted for the preceding interface version, the routine continues in block 708. In block 708, the routine invokes the next request adapter in the chain to reflect the prior version of the interface (or the interface adaptation manager to return the adapted response to the client that performed the request, not shown), which in the illustrated embodiment involves passing the adapted response to a new instance of the same routine that corresponds to the that adapter component in a recursive manner. Thus, until the routine is executed on behalf of the adapter component for the prior interface version corresponding to the initial request, with the response having been adapted to that interface version, each adapter component in the chain will successively adapt the response and then forward it to a next adapter component in the chain. The routine then continues to block 710 to determine whether to continue. If so, the routine returns to block 702, and if not continues to block 712 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. For example, the methods and systems for enhancing access to software services discussed herein are applicable to architectures other than a Web-based architecture. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A method in a configured computing system of a task exchange system for facilitating interactions between the task exchange system and one or more remote clients, the task exchange system acting as an intermediary to facilitate performance by human task performer users of tasks from task requester users, the method comprising:

under control of the configured computing system of the task exchange system,
providing to remote clients an interface for the task exchange system that is available for use by the remote clients in requesting functionality from the task exchange system, the provided interface having a succession of distinct interface versions that each define a distinct set of operations that may be requested by the remote clients, the succession of interface versions being from a first prior interface version through one or more intermediate prior interface versions to a current interface version;
providing adapter components associated with each of the interface versions of the succession other than the current interface version, each adapter component being configured to adapt a request specified in accordance with the defined operations of the associated interface version so that the adapted request is specified in accordance with the defined operations of a next interface version in the succession and/or being configured to adapt a request response specified in accordance with the next interface version in the succession so that the adapted response is specified in accordance with the associated interface version;
receiving multiple requests that are each from one of multiple remote clients to request indicated functionality from the task exchange system, each request indicating one of the interface versions and indicating the requested functionality by specifying in a format specific to the indicated interface version one or more operations defined by the indicated interface version, the multiple received requests including one or more requests that indicate the current interface version and including one or more other requests that indicate one of the prior interface versions in the succession;
automatically responding to the received requests by, for each of the requests, if the indicated interface version for the received request is one of the interface versions in the succession other than the current interface version:
automatically verifying that the one or more operations specified in the received request in the format specific to the indicated interface version are valid for the indicated interface version;
automatically adapting the received request to indicate the requested functionality in accordance with the current interface version in such a manner as to specify one or more operations in a format specific to the current interface version, the adapting including successively using the adapter components associated with the indicated interface version and with the interface versions that are between the indicated interface version and the current interface version in the succession so as to successively adapt the received request to each of the interface versions in the succession after the indicated interface version and through the current interface version; and
providing to the remote client for the received request the requested functionality for the adapted received request based on the one or more operations specified in the format specific to the current interface version, the providing of the requested functionality including adapting a response obtained in a format specific to the current interface version to be in a format specific to the indicated interface version and providing to the remote client the adapted response, the adapting of the obtained response including successively using the adapter components associated with the interface versions from the current interface version to the indicated interface version in the succession so as to successively adapt the obtained response to each of those associated interface versions; and after the automatic responding to the received requests:
receiving an indication of a new current interface version in the succession for the provided interface such that the interface version that was previously the current interface version becomes one of the intermediate prior interface versions, the new current interface version defining a set of operations having one or more differences from the defined set of operations for the previous current interface version;

generating an adapter component associated with the previous current interface version that is configured to adapt a request specified in accordance with the defined operations of the previous current interface version so that the adapted request is specified in accordance with the defined operations of the new current interface version, and that is configured to adapt a request response specified in accordance with the new current interface version so that the adapted response is specified in accordance with the previous current interface version; and after the generating of the adapter component,
receiving one or more additional requests that each indicate the previous current interface version and indicate requested functionality by specifying in a format specific to the indicated interface version one or more operations defined by the indicated interface version; and automatically responding to each of the received additional requests by:
automatically adapting the received additional request to indicate the requested functionality in accordance with the new current interface version by using the generated adapter component; and providing the requested functionality for the adapted received additional request by using the generated adapter component to adapt a response obtained in a format specific to the new current interface version to be in a format specific to the previously current interface version.

2. The method of claim 1 wherein the automatically responding to each of the received requests includes, if the indicated interface version for the received request is the current interface version:
automatically verifying that the one or more operations specified in the received request in the format specific to the current interface version are valid for the current interface version; and
if the one or more operations specified in the received request are verified as being valid, and without adapting the received request or a response obtained to received request, providing to the remote client for the received request the requested functionality for the received request based on the one or more operations specified in the received request in the format specific to the current interface version.

3. The method of claim 1 wherein the providing of the interface for the task exchange system includes providing one or more Web services for each of the interface versions of the succession, each Web service having one or operations that may be requested by remote clients and that are defined by an associated Web Services Description Language ("WSDL") specification.

4. The method of claim 1 wherein the computing system is one of one or more computing systems that provide the task exchange system, wherein the functionality available from the task exchange system via the provided interface includes at least one of functionality to supply tasks to be performed by others and functionality to perform tasks supplied by others, and wherein the remote clients are computing devices operating on behalf of task performer users and/or task requester users in order to obtain the available functionality.

5. A computer-implemented method for facilitating interactions between a server system and remote clients, the method comprising:
receiving an indication of a first request from a first remote client that is in a first format to use a specified version of an interface to a server system, the interface to the server system having multiple distinct versions that each support a distinct set of operations of the server system that may be requested by remote clients, the multiple distinct interface versions including a succession from a prior first interface version to a current interface version, the specified interface version for the first request being an interface version that is prior to the current interface version and that supports one or more operations including a first operation indicated by the first request;

automatically adapting the first format of the received first request to a format corresponding to the current interface version by successively using one or more adapter components, a first of the one or more used adapter components being configured to modify the first format of the first request to reflect changes involving the first operation between the specified interface version and a next interface version in the succession, each of the one or more used adapter components other than the first adapter component being configured to modify a format of a request to reflect changes involving the first operation between a corresponding prior interface version and the next interface version in the succession, so as to adapt the first request from the first format to successive next formats corresponding to successive next versions of the interface in the succession until the first format is adapted to the format corresponding to the current interface version, the automatic adapting of the first format of the received first request to the format corresponding to the current interface version being performed by one or more configured computing systems;

after the adapting of the received first request to the format corresponding to the current interface version, initiating provision of functionality corresponding to the first operation by the server system based on use of the adapted first request in the format corresponding to the current interface version;

receiving a response corresponding to the functionality provided by the server system for the first operation based on the use of the adapted first request, the received response being in a format that corresponds to the current interface version;

automatically adapting the format of the received response to the first format of the specified interface version by successively using the one or more adapter components, the one or more used adapter components each further being configured to modify a format of a response to reflect changes involving the first operation from a corresponding interface version to a prior interface version in the succession, the automatic adapting of the format of the received response to the first format of the specified interface version being performed by the one or more configured computing systems; and after the adapting of the format of the received response to the first format of the specified interface version, initiating provision of the received response in the adapted first format to the first remote client.

6. The method of claim 5 further comprising:

receiving an indication of a second request from a second remote client that is in a format to use the current version of the interface to the server system, the second request indicating a second operation supported by the current interface version; and without adapting the received second request, initiating provision of functionality corresponding to the second operation based on use of the received second request.

7. The method of claim 6 wherein the method is performed under control of the server system, the one or more configured computing systems being at least part of the server system.

8. The method of claim 5 wherein each of the multiple distinct versions of the interface to the server system are defined using an associated Web Services Description Language ("WSDL") specification.

9. The method of claim 5 wherein the first request is received from the first remote client over the Internet.

10. The method of claim 5 wherein the server system provides to remote clients multiple distinct software services that each have a distinct interface, and wherein the first request is to use the interface for one of the multiple software services.

11. The method of claim 5 wherein the initiating of the provision of the functionality corresponding to the first operation includes invoking a Web service implementation that implements the first operation according to the current interface version.

12. The method of claim 5 wherein the succession from the prior first interface version to the current interface version includes one or more intermediate prior interface versions.

13. The method of claim 5, further comprising:

before the receiving of the indication of the first request, receiving an indication of the current version of the interface as being a new current interface version, such that a previously current interface version becomes one of the intermediate prior interface versions in the succession to the current interface version; and generating an interface adapter component that is configured to adapt a request that is in a format to use the previously current interface version to the format corresponding to the current interface version, such that the generated interface adapter component is a last of the one or more used adapter components.

14. The method of claim 13 wherein the current interface version adds one or more operations that were not available in the set of operations for the previously current interface version, and wherein the generating of the interface adapter component includes configuring the generated interface adapter component to, for a request in the format to use the previously current interface version that indicates one of the added operations, generating an error for the request based on the previously current interface version not supporting the one added operation.

15. The method of claim 14 further comprising receiving an indication of a second request that is in a format to use the current interface version and that indicates to use the one added operation, and initiating provision of functionality corresponding to the one added operation based on the current interface version supporting the one added operation.

16. The method of claim 13 wherein the current interface version removes one or more operations that were available in the set of operations for the previously current interface version, and wherein the generating of the interface adapter component includes configuring the generated interface adapter component to, for a request in the format to use the previously current interface version that indicates one of the removed operations, modify the indication of the one removed operation in the adapted format corresponding to the current interface version so that the one removed operation is provided in accordance with functionality of the previously current interface version.

17. The method of claim 16 wherein the modifying of the indication of the one removed operation in the adapted format corresponding to the current interface version includes flagging the indication of the one removed operation in the adapted format corresponding to the current interface version so that an absence of the one removed operation in the current interface version does not generate an error.

18. The method of claim 16 further comprising receiving an indication of a second request that is in a format to use the current interface version and that indicates to use the one removed operation, and generating an error for the second request based on the current interface version not supporting the one removed operation.

19. The method of claim 13 wherein the current interface version modifies a parameter used by one of the operations in the set of operations for the previously current interface version, and wherein the generating of the interface adapter component includes configuring the generated interface adapter component to, for a request in the format to use the previously current interface version that indicates the one operation and includes a value for the modified parameter, transform the indication of the one operation in the adapted format corresponding to the current interface version so as to use the modified parameter in a matter corresponding to the current interface version.

20. The method of claim 19 wherein the modifying of the parameter includes one of changing the modified parameter and removing the modified parameter.

21. The method of claim 13 wherein the current interface version adds a parameter used by one of the operations in the set of operations for the previously current interface version, and wherein the generating of the interface adapter component includes configuring the generated interface adapter component to, for a request in the format to use the previously current interface version that indicates the one operation, generate a value for the added parameter for the indication of the one operation in the adapted format corresponding to the current interface version.

22. The method of claim 13 wherein the generating of the interface adapter component is performed as part of creating a current version of a software service that provides at least some of the operations of the set supported by the current interface version, and wherein the method further comprises, before the receiving of the indication of the first request, executing the current version of the software service for using in providing functionality to clients corresponding to the at least some operations.

23. The method of claim 5 wherein each version of the interface to the server system is a separate interface that can be requested by remote clients.

24. The method of claim 5 wherein the one or more used adapter components include multiple adapter components, and wherein at least one of the multiple adapter components acts a pass-through component for the first operations so as to not modify a format of a request that includes the first operation based on changes not occurring for the first operation between a corresponding interface version and the next interface version in the succession.

25. The method of claim 5 wherein the server system is a computer-implemented task exchange system that acts as an intermediary to facilitate performance by human task performer users of tasks from task requester users, and wherein the one or more configured computing systems provide the task exchange system.

26. The method of claim 25 wherein the first remote client provides capabilities to one or more task performer users, and wherein the first request is related to performance of one or more tasks supplied by other users.

27. The method of claim 25 wherein the first remote client provides capabilities to one or more task requester users, and wherein the first request is related to supplying one or more tasks to be performed by other users.

28. A computer-readable storage medium whose contents configure a computing system to facilitate interactions between a system and clients, by performing a method comprising:

receiving a first message from a first client that includes an indication of a first type of functionality requested from a system and receiving a second message from a second client that includes an indication of a second type of functionality requested from the system, the system having multiple distinct versions of a single interface to access functionality of the system, the indication of the first type of functionality of the first message being specified in accordance with a first version of the interface to the system and the indication of the second type of functionality of the second message being specified in accordance with a distinct second version of the interface to the system;

automatically adapting the indication of the first type of functionality of the first message so that it is specified in accordance with the second interface version, the adapting including successively performing one or more modifications to the indication of the first type of functionality that correspond at least in part to differences between the first and second interface versions, the automatic adapting being performed by the configured computing system;

after the adapting of the indication of the first type of functionality, initiating provision of functionality of the first type to the first client based on use of the adapted indication of the first type of functionality;

without adapting the indication of the second type of functionality, initiating provision of functionality of the second type to the second client based on use of the indication of the second type of functionality;

receiving an indication of a new current interface version for the interface to the system, the second interface version being prior to the new current interface version in a succession of interface versions, the new current interface version defining a set of operations having one or more differences from a defined set of operations for the prior second interface version;

generating an adapter component that is configured to adapt a request specified in accordance with the defined operations for the prior second interface version so that the adapted request is specified in accordance with the defined operations of the new current interface version; and after the generating of the adapter component, receiving one or more additional messages that each indicates a requested type of functionality by specifying one or more defined operations in accordance with the prior second interface version; and automatically responding to each of the received additional messages by using the generated adapter component to automatically adapt the received additional message to indicate the requested type of functionality by specifying one or more defined operations in accordance with the new current interface version.

29. The computer-readable storage medium of claim 28 wherein the second interface version is a current version of the interface before the receiving of the indication of the new current interface version, wherein the first interface version is an earlier version of the interface prior to the second interface version, wherein the interface has a succession of multiple versions that includes at least one version between the first interface version and the second interface version, wherein the indications of the first and second types of functionality in the first and second messages correspond to distinct versions of a single defined operation that have different forms in the first and second interface versions, and wherein the adapting of the indication of the first type of functionality of the first message to be specified in accordance with the second interface version includes using multiple adapter components that each modifies the indication of the first type of functionality to reflect differences in the form of the single defined operation between versions of the interface in the succession from the first interface version to the second interface version.

30. The computer-readable storage medium of claim 28 wherein the computer-readable medium is a memory of the configured computing system.

31. The computer-readable storage medium of claim 28 wherein the contents are instructions that when executed program the configured computing system to perform the method.

32. A computing system configured to facilitate interactions with clients, comprising:

one or more processors;

one or more memories;

an interface adaptation manager component configured to, when executed by at least one of the one or more processors, adapt received communications from clients to reflect a current version of an interface, the interface including multiple distinct versions from a first interface version to the current interface version, the first interface version including a first group of one or more definitions of accessing available functionality, each interface version other than the first interface version including a group of one or more definitions of accessing available functionality that has one or more differences from the group of definitions of accessing available functionality for a prior interface version, each of the received communications indicating requested functionality based on at least one indicated definition of one of the multiple interface versions, the adapting of the received communications including, for each of the received communications:

if the one interface version for the received communication is the current interface version, initiating provision of the requested functionality for the received communication based on the at least one indicated definition of the received communication; and if the one interface version for the received communication is an interface version other than the current interface version, automatically adapting the requested functionality of the received communication to reflect the current interface version by performing one or more modifications to the at least one indicated definition of the received communication, the one or more modifications corresponding at least in part to differences in the available functionality accessing definitions between the one interface version and the current interface version; and
initiating provision of the requested functionality for the received communication based on the modified at least one indicated definition of the received communication; and
a second component configured to, when executed by at least one of the one or more processors:
receive an indication of a new current interface version for the provided interface such that the interface version that was previously the current interface version becomes a prior interface version, the new current interface version including a group of one or more operation definitions that has one or more differences from the group of definitions for the previous current interface version; and
generate an adapter component associated with the previous current interface version that is configured to adapt a request specified in accordance with the group of definitions for the previous current interface version so that the adapted request is specified in accordance with the group of operation definitions for the new current interface version, and that is configured to adapt a request response specified in accordance with the new current interface version so that the adapted response is specified in accordance with the previous current interface version;
and wherein the interface adaptation manager component is further configured to, after the generating of the adapter component, adapt one or more additional received communications from clients to reflect the new current interface version, each of the one or more additional communications indicating requested functionality based on at least one indicated definition of the previous current interface version, the adapting of the received additional communications including, for each of the received additional communications, responding to the received additional communication by:
automatically adapting the requested functionality of the received additional communication to indicate the requested functionality in accordance with the new current interface version by using the generated adapter component; and
facilitating providing the requested functionality for the adapted received additional communication by using the generated adapter component to adapt a response that is based on at least one operation definition of the new current interface version to be based on at least one definition of the previous current interface version.

33. The computing system of claim 32 further comprising multiple adapter components that each corresponds to at least one of the interface versions, wherein the multiple interface versions are at least part of a succession of interface versions from the first interface version to the current interface version, and wherein the performing of the one or more modifications to the at least one indicated definition of a received communication includes successively using adapter components that correspond to interface versions in order of the succession from the one interface version for the received communication to the current interface version.

34. The computing system of claim 33 further comprising one or more components that provide functionality in accordance with the interface to remote clients, and wherein the initiating of the provision of requested functionality for a received communication includes providing the requested functionality under control of at least one of the one or more components.

35. The computing system of claim 32 wherein the interface adaptation manager component includes software instructions for execution by the computing system.

36. The computing system of claim 32 wherein the interface adaptation manager component consists of a means for adapting received communications from remote clients to reflect a current version of an interface by, for each of the received communications:
if the one interface version for the received communication is the current interface version, initiating provision of the requested functionality for the received communication based on the at least one indicated definition of the received communication; and
if the one interface version for the received communication is an interface version other than the current interface version,
automatically adapting the requested functionality of the received communication to reflect the current interface version by performing one or more modifications to the at least one indicated definition of the received communication, the one or more modifications corresponding at least in part to the differences in the available functionality definitions from the one interface version to the current interface version; and
initiating provision of the requested functionality for the received communication based on the modified at least one indicated definition of the received communication.

* * * * *